US005406530A

United States Patent [19]

Yamamoto

[11] Patent Number: 5,406,530
[45] Date of Patent: Apr. 11, 1995

[54] PSEUDO-RANDOM BINARY SEQUENCE MEASUREMENT METHOD

[75] Inventor: Tokuo Yamamoto, Miami, Fla.

[73] Assignee: Kawasaki Steel Corporation, Japan

[21] Appl. No.: 257,468

[22] Filed: Jun. 8, 1994

Related U.S. Application Data

[63] Continuation of Ser. No. 79,954, Jun. 18, 1993, abandoned, which is a continuation of Ser. No. 853,977, Mar. 20, 1992, abandoned.

[51] Int. Cl.$^6$ .............................................. G01V 1/40
[52] U.S. Cl. ...................................... 367/57; 181/102; 367/39
[58] Field of Search ................. 367/25, 39, 41, 57, 367/86, 32, 49; 364/421, 422; 73/151; 181/102

[56] References Cited

U.S. PATENT DOCUMENTS

| 3,234,504 | 2/1966 | Wischmeyer | 367/189 |
| 3,264,606 | 8/1966 | Crook et al. | 367/39 |
| 4,214,226 | 7/1980 | Narasimhan et al. | 367/57 |
| 4,346,461 | 8/1982 | Muir | 367/39 |
| 4,780,856 | 10/1988 | Becquey | 367/39 |
| 4,805,725 | 2/1989 | Paulsson | 181/106 |
| 5,062,084 | 10/1991 | Schoepf et al. | 367/57 |
| 5,144,590 | 9/1992 | Chon | 367/57 |

OTHER PUBLICATIONS

Cunningham, A., "Some Alternate Vibrator Signals," Geophysics, vol. 44, #12, pp. 1901–1921, Dec. 1979.

*Primary Examiner*—Ian J. Lobo
*Attorney, Agent, or Firm*—Austin R. Miller

[57] ABSTRACT

A non-destructive method of measuring physical characteristics of sediments to obtain a cross-sectional distribution of porosity and permeability values and variations, and of shear modulus and shear strength. A pair of boreholes have borehole entries spaced apart from each other at a predetermined distance, and a plurality of hydrophones are spaced at predetermined known positions. A pseudo-random binary sequence code generator as a source of seismic energy is placed into another borehole and activated to transmit pseudo-random wave energy from the source to the hydrophones. Seismic wave characteristics are measured in a multiplicity of paths extending from the source to the hydrophones, using cross-bore tomography.

20 Claims, 4 Drawing Sheets

PSEUDO-RANDOM BINARY SEQUENCE MEASUREMENT METHOD

This application is a continuation of application Ser. No. 08/079,954, filed Jun. 18, 1993, now abandoned, which is a continuation of application Ser. No. 07/853,977, filed Mar. 20, 1992, now abandoned.

FIELD OF THE INVENTION

This invention relates to a non-destructive method of measuring physical characteristics of sediments, particularly marine sediments, in order to obtain a cross section distribution of porosity and permeability values and variations of the sedimentary material, and of shear modulus and shear strength as well. More particularly, this invention relates to the use of pseudo-random binary sequence code driven acoustic transmission in analyzing saturated sediments.

PRIOR ART

In our report entitled "Synthetic Seismograms for Marine Sediments and Determination of Porosity and Permeability", Geophysics, Volume 53, No. 8 (August 1988), Pages 1056-1057, we presented numerical simulations of vertical seismic profiles of marine sediments. Vertical seismic profiling of the type referred to in that report has considerable use in the search for placer deposits, resolving problems of engineering geology and the construction of hydro-technical projects. In typical vertical seismic profiling, studies of marine sediments were conducted using high powered electrical sources, and the usable frequency range in such work has been found to be from about 100 Hz to 2000 Hz, whereby penetrations in the marine sediments could be achieved over a distance of more than a thousand meters.

Using a single borehole, vertical seismic profiling was described in the aforesaid report as a series of tests in which both the source and the receiver of the seismic energy were positioned in the same borehole. Such a relationship has produced results of considerable interest, all as described in detail in the aforementioned report.

Useful results, both theoretical and practical, may be obtained by the use of vertical seismic profiling as referred to in the above-identified report. Spectral ratio calculations on synthetic examples using Biot's theory and the results obtained by the vertical seismic profiling method can be used to determine the porosity and permeability of marine sediments. However, it is highly desirable to obtain more accurate determinations of physical characteristics of sediments, particularly to obtain an accurate cross-sectional distribution of porosity and permeability values and variations of the sediment.

In "Measurements of Acoustic Wave Velocities and Attenuation in Marine Sediments", (Turgut and Yamamoto), *J. Acoust. Soc. Am.*, 87(6), June 1990, a non-destructive method is discussed for measuring physical characteristics of sediments. This method applies particularly to marine sediments, and serves to obtain a cross section distribution of porosity and permeability values. It also discovers variations of the sedimentary material, and values of shear modulus and shear strength as well. In the method, velocity measurements are obtained by propagating seismic energy signals directly from source to receiver by direct cross-bore tomography. This method produces much more accuracy and clarity than heretofore obtained without the use of the cross-bore measurement technique. The seismic energy is projected between two or more vertical boreholes spaced apart from each other.

However, difficulties have been encountered in using such techniques in noisy environments, such as iron foundries and the like, and limitations have been experienced as to the distances that can be spanned from one cross bore to the other cross bore. Further, difficulties have been experienced in utilizing such measurement techniques at high frequencies.

OBJECTS OF THE INVENTION

Accordingly, it is an object of this invention to provide a novel and highly accurate non-destructive method of measuring physical characteristics of sediments, particularly to obtain accurate cross-sectional distributions of porosity and permeability values and variations, and to obtain accurate and clear measurements even when the method is practiced in a noisy environment.

It is still another object of this invention to practice the method at great distances between cross bores, such as distances as far as a mile or even more.

Further, another object of this invention is to provide such a novel and highly accurate non-destructive method of measurement at high frequencies not heretofore possible.

Still another object of the invention is to obtain accurate evaluations of porosity and permeability by high frequency acoustic tomography.

Yet another object is to provide a novel method for determining permeability distribution of sediments with speed and accuracy.

Other important objects and advantages of this invention will further become apparent hereinafter, and in the drawings, of which:

DRAWINGS

DESCRIPTION OF THE INVENTION

Figure 1:
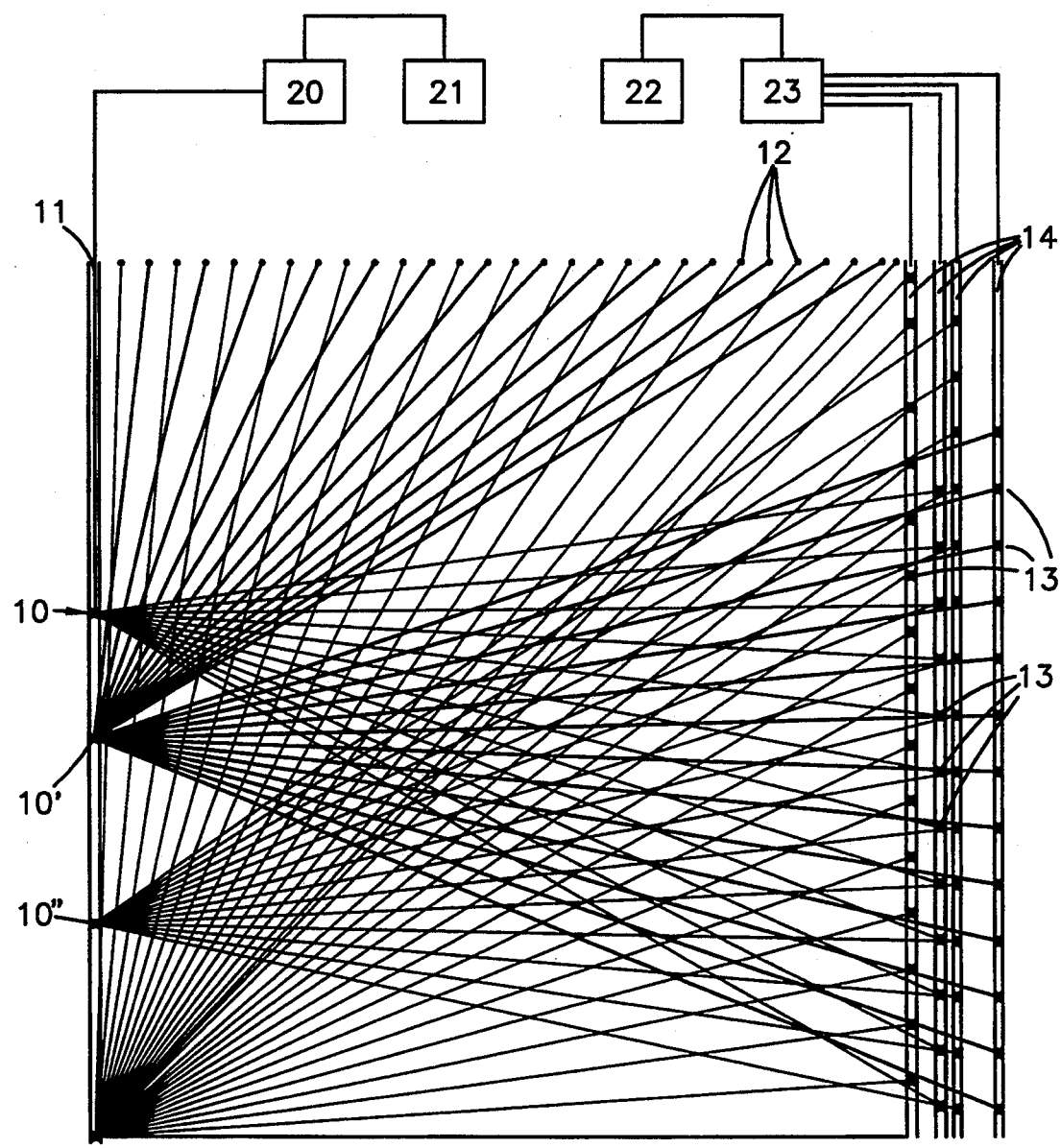
FIG. 1 is a schematic diagram, shown as indicating a vertical section through the sediment, illustrating one particular embodiment of the invention, including source and receiver locations for acoustic tomography.

It has now been discovered that it is important to obtain measurements of sedimentary characteristics by propagating seismic energy signals directly from source to receiver by direct cross-bore tomography, by using an electromagnetic sounding system using a pseudo-noise source in the form of a pseudo-random binary sequence, or PRBS. A pseudo-random binary sequence is a a multilevel signal of irregular shape that has a repetitive sequence of a predetermined, irregular pattern. The repetitive sequence is also called a carrier signal.

The use of such a pseudo-random binary sequence, operating in a cross-bore configuration in the sediment, allows effective and accurate operation in a noisy environment even in the presence of engine noises and other extraneous interferences, and allows the experimenter to send his cross-bore signals through unusually great distances such as 600 feet or even one mile or more, with excellent results. The use of the PRBS provides excellent operation even at unusually high frequencies. The PRBS source of the energy is radically different from, and superior to, previously used piezoelectric ceramic transducer, otherwise referred to as a sparker, emitting a one-level regular wave when positioned at a known location in another borehole spaced apart from the borehole containing the hydrophones.

Accordingly, in accordance with this invention, we have provided a non-destructive method of measuring physical characteristics of sediments to obtain a cross-sectional analysis by forming at least a pair of boreholes having borehole entries that are widely spaced apart from each other at a predetermined distance. The boreholes extend at least to known depths from the sediment surface, and contain a plurality of receivers such as hydrophones or geophones spaced at predetermined positions within the borehole and also possibly along the sediment surface. A source of noise, in the form of a pseudo-random binary sequence emitter, is placed into another borehole at a known position with respect to the receivers, and the source is activated to transmit wave energy from the source to all of the receivers. By measuring the wave characteristics and paths directly transmitted between the PRBS source and the receivers, in a multiplicity of paths extending from the position of the source to the positions of the receivers, significant measurements may be made in regard to sediment characteristics. Further, by moving the source to another known position within the source borehole and again activating the source, further measurements can be made on a multiplicity of new paths extending to the receivers. By combining the results of such series of measurements, it is possible to obtain accurate and reliable cross-sectional values and variations in the sedimentary materials. The results, obtained by PRBS propagating and receiving signals directly produces far more reliable results than previously available.

In accordance with this invention it is important that we are now able to obtain reliable porosity and permeability results through long distances from direct velocity measurements using the PRBS attenuation of sound to obtain excellent permeability readings. This is of practical importance in regard to resolving ground water problems, in oil field exploration and elsewhere. Porosity determination according to this invention is especially beneficial in the case of oil field exploration since only a small percentage of the existing oil can usually be recovered since the remainder is absorbed in the pores of the sediment. In utilizing the method of this invention it is possible to predict with accuracy the location of the area of least porosity, which is the area in which free oil is most likely to be located, thus indicating preferred locations for exploration and extraction of oil based upon permeability distribution.

It is important in accordance with this invention, instead of utilizing a vertical seismic profile having only a single borehole with the source and the receiver in the same borehole, to utilize spaced apart boreholes, and to measure across from one borehole to another, as described. We refer to this new PRBS technique, in an abbreviated manner, as PRBS cross-hole tomography, and have found it very effective in checking the permeability profile of the ground.

In accordance with one embodiment of this invention, tests may be conducted utilizing acoustic transmission from a piezoelectric source by changing the PRBS carrier frequency at 1, 2, 4, 8 and 10 kHz, using a piezoelectric acoustic transducer as the source, and with hydrophones comprising the receivers, positioned along the surface of the sedimentary deposit and extending down through a separate borehole spaced apart from the borehole containing the piezoelectric source. Additional tests conducted in the same manner can be performed by changing the location of the source in the borehole.

As one example, the spaced apart bores may extend vertically into the sedimentary material. They may be spaced apart from each other, for example at about 70 to 200 meters, and direct transmission may be instituted from the source to all of the hydrophones, measuring the signatures from each hydrophone via an amplifier and/or recorder in a manner to measure compressional wave velocity and specific attenuation between the boreholes. Specific attenuation measurements may be made by using the spectral ratio method, and the compressional wave velocity and specific attenuation may be readily calculated from the phase spectra and transfer function. In this manner, cross-hole tomography is used to check spacial inhomogeneities.

Accordingly, in this invention, acoustic pulse transfers are conducted in sedimentary materials, and are discovered to reveal compressional wave velocities that are dispersive, especially in certain frequency ranges where specific attenuation is at a maximum. Porosity and permeability are readily estimated, using the well-known Biot theory, from the compressional wave velocity and the specific attenuation, all as described in detail in our report in *J. Acous. Soc. Am.*, 87(6) June 1990, the disclosure of which is incorporated herein by reference.

By using a piezoelectric acoustic transducer with a PRBS generator in the aforementioned cross-borehole tomography, not only compressional wave but also a shear wave is generated. Accordingly, from a knowledge of shear wave velocity, shear wave velocity distribution within the sedimentary formation may be measured accurately, then we can further determine shear modulus and shear strength of the sediments. These are important for construction engineering purposes and for accurate determination or existence of hydrogens, such as oil and gas.

Shear wave velocity values directly determine the shear modulus and the shear strength values of sediments. Knowledge of shear wave velocity values in addition to compressional velocity values provide important information of existence or non-existence of hydrocarbons, such as oil and gas, within the sedimentary formation.

Turning now to the drawings, FIG. 1 is a diagram showing PRBS sources 10 located in a borehole 11, serving as a propagator for the acoustic tomography measurements. Boreholes 11 may be made of plastic casings of 5-inch diameter, for example. The number 12 indicates a multiplicity of spaced apart hydrophones along the sedimentary surface, while the number 13 designates a multiplicity of hydrophones vertically spaced apart from each other in the vertically extending boreholes 14. Boreholes 14, 11 are spaced apart from each other for a distance such as 70–200 meters or more as shown in the Figure, and the boreholes themselves may be, for example, 3–10 meters deep and parallel to each other. Accordingly, measurements are made preferably simultaneously at a wide variety of different angles in regard to wave energy propagated by the PRBS source, and all of such measurements are based upon direct propagation from the source 10 to the receivers 12, 13 (hydrophones) and are not based upon the necessity for echoes or other phenomena within the sediment. The sources are powered by the PRBS code generator 21 and the power amplifier 20 and the signals received are amplified by amplifier 23 and may be recorded by recorder 22.

Assuming a multiplicity of measurements are taken with the transducer 10 at the location 10', the transducer may then be lowered to another location 10" and the measurement process repeated. Still further measurements may be taken at a variety of other locations within the transducer borehole 11, without the need to move any of the hydrophones 12, 13.

Figure 2:
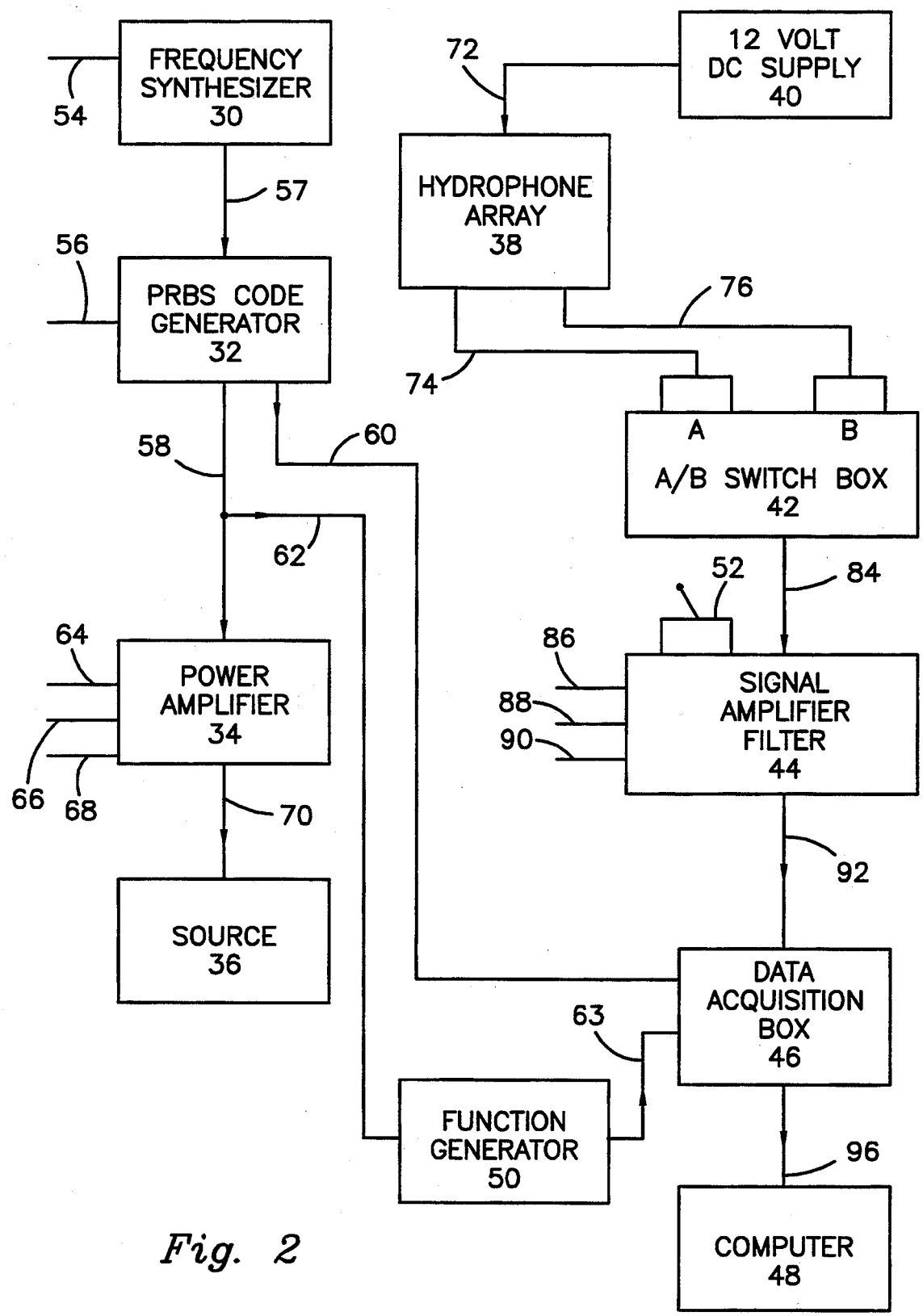
FIG. 2 is a schematic diagram illustrating the apparatus used in one embodiment of the invention.

In one embodiment of the invention, the principle instruments used to generate and measure PRBS signals are a source, hydrophone array, signal amplifier and filter, PRBS generator, frequency synthesizer, power amplifier, function generator, data acquisition box, A/B switch box, DC power supply and computer. This apparatus is shown in FIG. 2 and will be described in further detail hereinafter.

The frequency synthesizer designated generally 30 produces a carrier wave generally capable of constant amplitude, frequency and phase, which can be modulated. Modulation, as used herein, is caused by a PRBS generator, causing a controlled variation of frequency, phase and/or amplitude of the carrier wave. This may be of any frequency in order to transmit a signal wave. Frequency synthesizer 30 receives power through line 54.

The frequency synthesizer connects to the pseudo-random binary sequency (PRBS) code generator designated generally 32 through line 57. PRBS code generator 32 receives power through line 56. The PRBS code generator 32 generates pseudo-random binary sequences up to $2^{12}$ or 4,096 bits in length, for example. The output signal from the generator can be modulated by amplitude, phase or pulse modulators. The frequency of the output code to the PRBS code generator 32 is, for example, 1/64 of the frequency produced by the frequency synthesizer 30.

The PRBS code generator 32 connects to the variable power switching power amplifier designated generally 34 through line 58. Power amplifier 34 may have any maximum power output and maximum voltage output. Convenient examples are 4 kVA and 1400 volts. Input to power amplifier 34 should be limited, for example, to ±1.0 volt through lines 66 and 68 to obtain maximum voltage at the output. Power amplifier 34 connects to ground through line 64. Power amplifier 34 protects against every kind of short circuit or overrating. The frequency response of the power amplifier 34 is preferably substantially flat between 700 Hz and 20 kHz.

A piezoelectric acoustic transducer designated generally 36 connects to power amplifier designated generally 34 through line 70. The piezoelectric acoustic transducer 36 generates a voltage, which is an electrical signal. The piezoelectric acoustic transducer generates a sound wave. Piezoelectric acoustic transducer 36 has a built-in 4× voltage transformer, for example. Therefore, the voltage sent to the piezoelectric acoustic transducer 36 should preferably be limited to about ¼ of the maximum voltage rating of piezoelectric acoustic transducer 36.

Twenty-four hydrophones, for example, are arranged in a predetermined, fixed pattern to create the hydrophone array designated generally 38. Hydrophone array 38 is, for example, a twenty-four element oil-filtered array. The hydrophone is an electroacoustic transducer which responds to water-borne sound waves and delivers essentially equivalent electrical waves. Each hydrophone is capable of sensing signals whose frequency may be as low as 1.0 Hz or lower. A DC power supply designated generally 40 powers hydrophone array 38 through line 72.

Cables designated generally 74 and 76 connect hydrophone array 38 to A/B Switch Box designated generally 42. Twelve of the hydrophones, for example, connect to terminal A and twelve of the hydrophones connect to terminal B.

Cable, which is preferably an RS232 cable or the like is designated generally 84, connects A/B Switch Box with a custom signal amplifier filter designated generally 44. Signal amplifier filter 44 connects to ground through line 90. A/B Switch Box 42 connects to low voltage such as 15 volts through line 86 and −15 volts through line 85. Signal amplifier filter 44 is preferably a variable gain, differential input, single-ended output signal amplifier or the like. The input differential signal is preferably high-pass filtered, 30 dB at nearly 500 Hz. The signal is then preferably amplified, for example, by any of the following gains: 1, 2, 5, 10, 20, 50, 100, 200, 500, 1000, 2000. This particular amplifier 44 can amplify, for example, twelve channels at a time for these gains. However, other amplifiers capable of amplifying more or less than twelve channels may be used. Manual switch designated generally 52 connects to the signal amplifier filter 44.

A cable designated generally 92, which is preferably an RS232 cable, connects signal amplifier filter 44 to Data Acquisition Box designated generally 46. PRBS code generator 32 also connects to Data Acquisition Box 46 through line 60. In addition, PRBS code generator 32 connects to the function generator designated generally 50 through line 62 which in turn connects to Data Acquisition Box 46 through line 63. Data Acquisition Box 46 preferably acts as a junction box, which routes connections for PRBS generator 32 and signal amplifier filter 44 to a cable, preferably a flat cable, designated generally 96, which in turn connects to a multi-channel Analog/Digital (A/D) board installed in a computer designated generally 48 such as a 386/33 MHz IBM compatible computer with vast storage facilities. The A/D board may have sixteen channels but could have more or less. The A/D board preferably receives sensed signals from the hydrophones through channels 1–12; the PRBS generator output signal through channel 13; and the external clock through channel 15.

Frequency synthesizer 30 supplies the carrier frequency needed for digital operations in the PRBS code generator 32. The PRBS code generator modulates the carrier wave to transmit a pseudo-random binary sequence signal wave. Power amplifier 34 amplifies this signal wave. The piezoelectric transducer 36 transmits the amplified signal wave.

Hydrophone array 38 senses a pseudo-random binary sequence signal wave. Hydrophone array 38 may contain 24 individual hydrophones. Signal wave sensed by twelve hydrophones preferably passes to terminal A of the A/B Switch Box 42. Signal wave sensed by the other twelve hydrophones preferably passes to terminal B of A/B Switch Box 42. Switch 52, which is attached to signal amplifier filter 44, permits signal amplifier filter 44 to receive the sensed signal wave from terminal A or terminal B depending on the position of the switch 52. Signal amplifier 44 amplifies and filters the signal wave as sensed by each hydrophone and outputs this information to Data Acquisition Box 46. Data Acquisition Box 46 also receives an external clock signal and the original pseudo-random binary sequence signal wave from PRBS generator 32. The Acquisition Box 46 also receives input from function generator 50. Data Acquisition Box 46 passes this information to a multi-channel Analog/Digital (A/D) board installed in a computer 48 such as a 386/33 MHz IBM compatible computer.

In order for this apparatus to function to best advantage, the frequency rate produced by the PRBS code generator 32 would be preferably in the range of four times the source frequency. The higher the computer sampling rate of the A/D board, the fewer the number of hydrophones that could be measured at a time, because the input rate at which the A/D board must sweep equals the number of channels times the sampling rate. There is preferably one channel per hydrophone. This means that if only four hydrophones could be sampled one time, the computer would preferably digitally sample or record the sensed data from the first four hydrophones, then the second four hydrophones, and then the third four hydrophones. The computer may constantly repeat this sampling.

Averaging is the process of taking multiple sequence lengths such as PRBS signals and stacking them on top of one another to reduce noise and enhance the signal. When averaging is not always desired, the computer's internal clock can be used to record the sensed data.

Computer 48, function generator 50 and the external clock from a PRBS code generator 32 work together to perform averaging. The external clock from the PRBS code generator synchronizes the sensed signal with the PRBS signal. During averaging, the external clock from the PRBS generator should be used so that no drift occurs between the source signal and the signal measured by the hydrophones. Function generator 50 tells the computer when a pseudo-random binary sequence has ended. Once a designated number of binary sequences has been sensed, these sequences are stacked on top of one another to reduce noise and enhance the signal. Frequency rate of the PRBS generator, which is four times the source frequency, is split using the function generator to match the input frequency. For example, at 1 kHz, the frequency of the external clock is 4 kHz; to measure one channel at 8 kHz sampling rate, this signal will be split into fourteen cycles by the function generator. The input rate applied to the external clock channel of the A/D board becomes 56 kHz. A square pulse coming from channel 15 of the A/D board indicates that the external clock is in use.

Data acquisition programs stored in computer memory use the external or internal clock to read the sensed signals from the hydrophones, store the sensed signals in memory and perform calculations such as averaging.

Function generator 50, PRBS code generator 32 and computer 48 with the appropriate data acquisition program work together to correlate the source signal with the measured signal to conduct the averaging process. The output from this correlation can be seen in time series data for each one of the hydrophones at one particular source position. From this, shear velocity, compressional wave velocity, shear strength, porosity, permeability and standard penetration can be determined. Standard penetration is defined as the number of times a pipe must be struck to get penetration.

EXAMPLE

Figure 3:
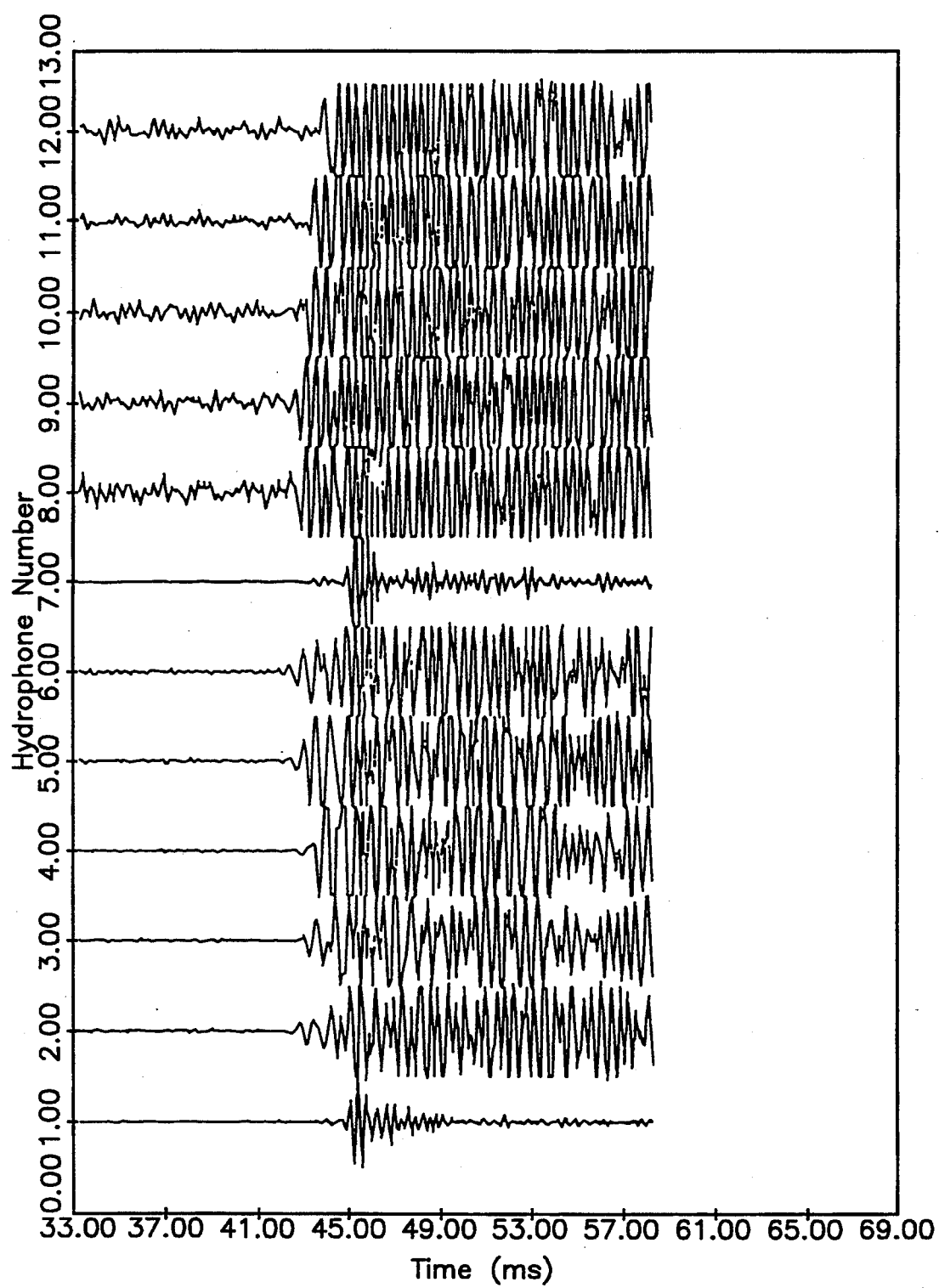
FIG. 3 is a time series graph showing initial data sensed by certain hydrophones.
Figure 4:
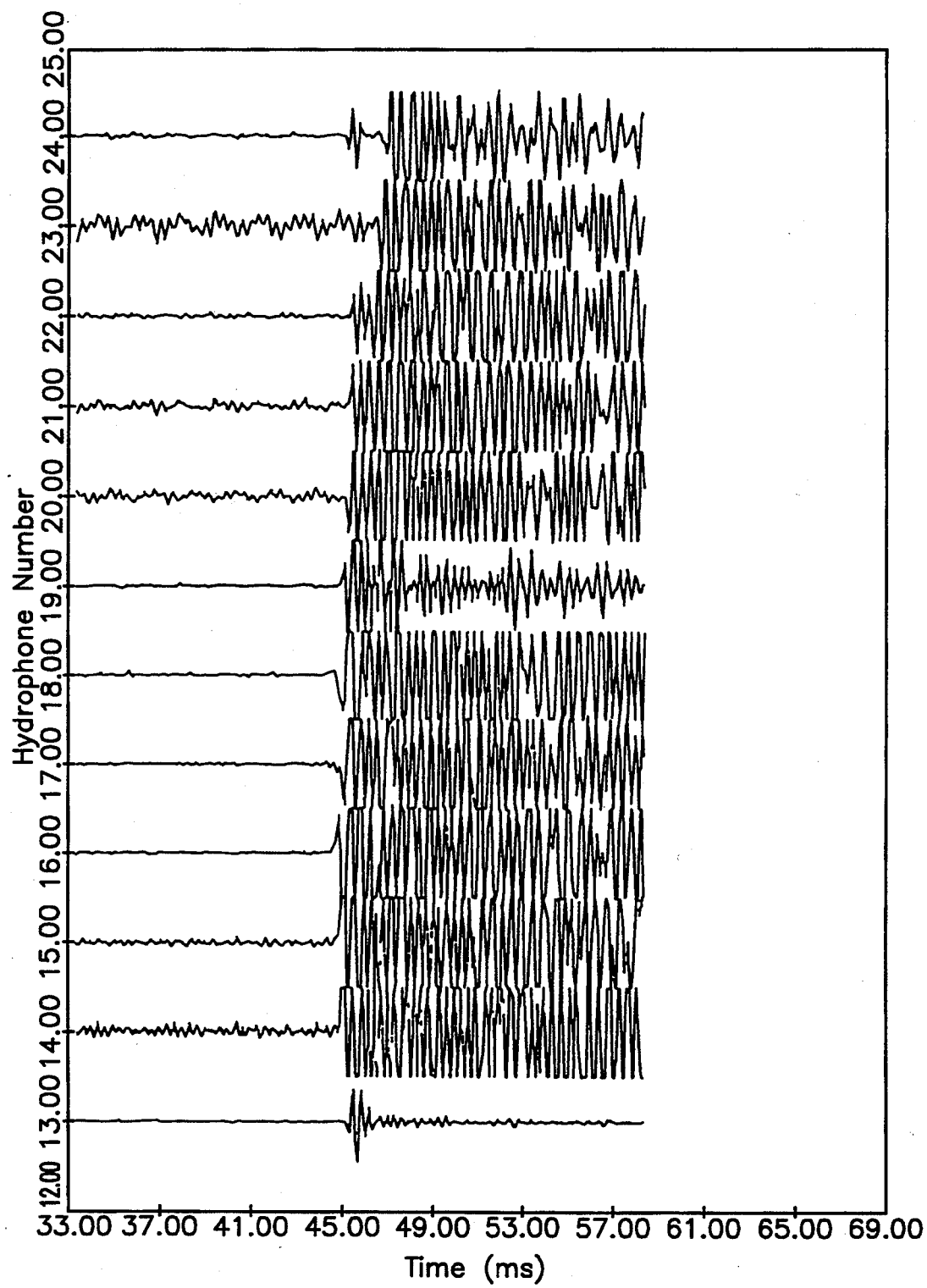
FIG. 4 is a time series graph showing initial data sensed by other hydrophones.

In accordance with one embodiment of the invention, cross-hole measurements were made using two deep boreholes 60 meters deep. The piezoelectric acoustic transducer 36 was placed in one borehole and hydrophone array 38 was placed in the other borehole. The cross-hole distance was 66.21 meters. PRBS code having a sequence length of 4095 was used to excite a 170 dB source at a carrier frequency of 3 kHz. Four averages were taken. The computer sampling rate was 12 kHz. The initial sensed data can be seen in the time series graphs in FIGS. 3 and 4. These graphs show the time when the signal first reached the hydrophone array 38. Using a travel time inversion computer program, compressional wave velocity tomographs can be constructed. Assuming a normal consolidation stress rate, the porosity, shear velocity, shear strength and SPT blow count can be determined then constructed from the compressional velocity profile. Finally, the permeability and grain size can be estimated from compressional velocity tomographs measured at two different PRBS carrier frequencies.

Seismic data processing and interpretation has both a qualitative and quantitative nature. The quality of seismic data processing can be measured by how well the process data can be interpreted. The time series graphs shown in FIGS. 3 and 4 receive a very good quality rating.

In this Example, using the embodiment of the invention shown in FIG. 2, computer 48 contained an A/D board capable of receiving data from twelve hydrophones. If the A/D board had been capable of receiving twenty-four channels, the A/B Switch Box 42 and switch 52 would have been unnecessary.

In this Example, using the embodiment shown in FIG. 2, a 170 dB source was used. If the dB of the source is increased, quality measurements between boreholes 1.0 mile apart may be obtained.

In addition, during the Experiment, four averages were taken. However, any number of averages can be taken in utilizing the invention.

Although this invention has been described with reference to a multiplicity of particular embodiments, it will be appreciated that many variations may be resorted to without departing from the spirit and scope of this invention. For example, more than two boreholes may be used for cross-hole tomography in accordance with this invention, and many relative positions and variations of positions as between the PRBS source and the receiver may be resorted to, so long as the respective positions are known. Further, although determination and calculation of characteristics such as porosity, permeability, permeability profile, shear modulus and shear strength may be arrived at by the use of various theories and equations, other analytical methods may be utilized as long as they are based upon the results of the method in accordance with this invention, wherein a PRBS source of seismic energy is located in a borehole, wherein a single hydrophone or a plurality of hydrophones are placed within another borehole spaced away from the PRBS source, wherein the PRBS source is activated to transmit seismic energy to the hydrophones, and measurements are made directly between the PRBS source and the receiver.

We claim:

1. In a non-destructive method of measuring physical characteristics of sediments, the steps which comprise:
    (a) forming a borehole extending at least to a known depth beneath the sediment surface, said borehole having an entry,
    (b) placing a hydrophone at a known position,
    (c) placing a source of pseudo-random code seismic energy at a known position with respect to said hydrophone, at least one of said hydrophone and said source being placed in said borehole,
    (d) generating a pseudo-random code causing said source to transmit seismic wave energy in at least two sequential transmissions at different frequencies each in the form of said pseudo-random binary sequence and each passing through said sediment from said source to said hydrophone,
    (e) measuring seismic wave characteristics of said wave energy at each said different frequency in a path extending from the known position of said source to the known position of said hydrophone,
    (f) moving the source of seismic energy to another known position relative to said hydrophone, and
    (g) again activating said source to transmit seismic wave energy in at least two sequential transmissions at different frequencies each in the form of said pseudo-random binary sequence through said sediment and making further pseudo-random code seismic wave characteristics measurements in a path extending beneath said sediment surface from said source to said hydrophone.

2. In a non-destructive method of measuring physical characteristics of sediments, the steps which comprise:
    (a) forming at least a pair of boreholes spaced apart from each other at a predetermined distance, said boreholes extending at least to known depths beneath the sediment surface, said boreholes having entries,
    (b) placing a hydrophone at a known position in a borehole beneath said sediment surface,
    (c) placing a source of pseudo-random code seismic energy into another of said boreholes beneath said sediment surface at a known position with respect to said hydrophone,
    (d) generating beneath said sediment surface a pseudo-random code causing said source to transmit seismic wave energy in at least two sequential shots at different frequencies through said sediment in the form of said pseudo-random binary sequence from said source to said hydrophone,
    (e) measuring seismic wave characteristics of said wave energy at each said different frequency in a path extending beneath said sediment surface from the known position of said source to the known position of said hydrophone,
    (f) moving the source of seismic energy to a known position relative to said hydrophone, said position being beneath said sediment surface, and
    (g) again activating said source to transmit seismic wave energy in at least two sequential shots at different frequencies through said sediment in the form of said pseudo-random binary sequence and making further pseudo-random code seismic wave characteristics measurement in a path extending through said sediment from said source to said hydrophone.

3. In a non-destructive method of measuring physical characteristics of sediments, the steps which comprise:
    (a) forming at least a pair of boreholes spaced apart from each other at a predetermined distance, said boreholes extending at least to known depths beneath the sediment surface, said boreholes having entries,
    (b) placing a plurality of hydrophones spaced at predetermined known positions substantially along said sediment surface between said borehole entries,
    (c) placing a multiplicity of hydrophones spaced apart from one another at known positions within at least one of said boreholes,
    (d) placing a source of pseudo-random code seismic energy into another of said boreholes at a known position with respect to said hydrophones.
    (e) activating said source according to said pseudo-random code to transmit seismic wave energy in at least two sequential shots at different frequencies through said sediment from said source in said another borehole to said hydrophones,
    (f) measuring seismic wave characteristics of said wave energy at each said different frequency in a multiplicity of paths extending through said sediment from the position of said source to the positions of said hydrophones,
    (g) moving the source of seismic energy relative to said hydrophones, and
    (h) again activating said source in at least two sequential shots at different frequencies and making further pseudo-random code seismic wave characteristics measurements in a multiplicity of paths through said sediment and extending to said hydrophones.

4. The method defined in claim 3 wherein said source of seismic energy is a piezoelectric ceramic transducer.

5. The method defined in claim 3 wherein said boreholes are substantially parallel to each other.

6. The method defined in claim 5 wherein said boreholes are substantially vertical.

7. The method defined in claim 3 wherein said boreholes are of substantially equal depth.

8. The method defined in claim 3 wherein said hydrophones are substantially equally spaced.

9. The method defined in claim 3 wherein said measuring step comprises measurement of specific attenuation and velocity of said transmitted seismic wave energy.

10. The method defined in claim 3 wherein the measured seismic wave characteristics include compressional wave velocity with frequency change.

11. The method defined in claim 3 wherein the measured seismic wave characteristics include specific attenuation with frequency change.

12. The method defined in claim 3 wherein the measured seismic wave characteristics include both compressional wave velocity and specific attenuation, both with frequency change.

13. The method defined in claim 3 wherein the pseudo-random signal frequency is varied.

14. The method defined in claim 13 wherein the pseudo-random binary sequence code carrier frequency is varied at about 1, 2, 4, 8 and 10 kilohertz.

15. The method defined in claim 3 wherein the respective boreholes are about 70–200 meters apart.

16. A non-destructive method of measuring physical characteristics of sediment, said method comprising the steps of:
- (a) placing at least one hydrophone at a known position;
- (b) placing a source of pseudo-random code seismic energy at a known position with respect to said at least one hydrophone;
- (c) generating a pseudo-random code causing said source to transmit said pseudo-random code seismic energy in at least two sequential transmissions at different frequencies from said source to said at least one hydrophone;
- (d) measuring the time required for said pseudo-random code seismic energy to travel from said source to said at least one hydrophone at each said different frequency;
- (e) moving said source to another known position with respect to said at least one hydrophone;
- (f) repeating steps (c) through (e); and
- (g) determining said physical characteristics of said sediments from said time required for said pseudo-random code seismic energy to travel from said source at each said known position to said at least one hydrophone at each said different frequency.

17. The method described in claim 16, wherein said method further comprises the steps of forming a borehole in said sediment and placing said at least one hydrophone within said borehole.

18. The method described in claim 16, wherein said method further comprises the steps of forming a borehole in said sediment and placing said source at said known position within said borehole.

19. The method described in claim 16, wherein said physical characteristic of said sediment is sediment permeability ($k_s$) and said sediment has a bulk density ($\rho$), a porosity ($\beta$), and a dynamic viscosity ($\eta$), and the step of determining said sediment permeability ($k_s$) at a relaxation frequency ($f_r$) for a fluid having a density ($\rho_f$) is performed according to the formula $$k_s = \frac{\rho \eta}{2\pi(\rho m - \rho^2 \rho_f f_r)} \frac{V_0}{V_\infty}$$

wherein m is an added mass value of $$\frac{(1 + \alpha)\rho_f}{\beta}$$

and $\alpha$ is an added mass, $V_o$ is said velocity of said pseudo-random code seismic energy as said frequency approaches zero, and $V_\infty$ is said velocity of said pseudo-random code seismic energy as said frequency approaches infinity.

20. The method described in claim 16, wherein said physical characteristic of said sediment is sediment permeability and said step of determining said sediment permeability includes the substeps of:
- (a) generating a compressional wave velocity tomograph for each said different frequency;
- (b) comparing two of said compressional wave velocity tomographs; and
- (c) preparing a compressional wave velocity difference tomograph.

* * * * *